INVENTOR.
W. D. CANNON
BY
W. F. Presson
ATTORNEY

INVENTOR.
W. D. CANNON
BY
[signature]
ATTORNEY

United States Patent Office 2,998,576

Patented Aug. 29, 1961

2,998,576

DRIVE PULSE GENERATOR FOR PROVIDING DIFFERENT SELECTABLE FREQUENCIES

William D. Cannon, Metuchen, N.J., assignor to The Western Union Telegraph Company, New York, N.Y., a corporation of New York Filed Apr. 9, 1958, Ser. No. 727,354
10 Claims. (Cl. 331—75)

Figure 1:
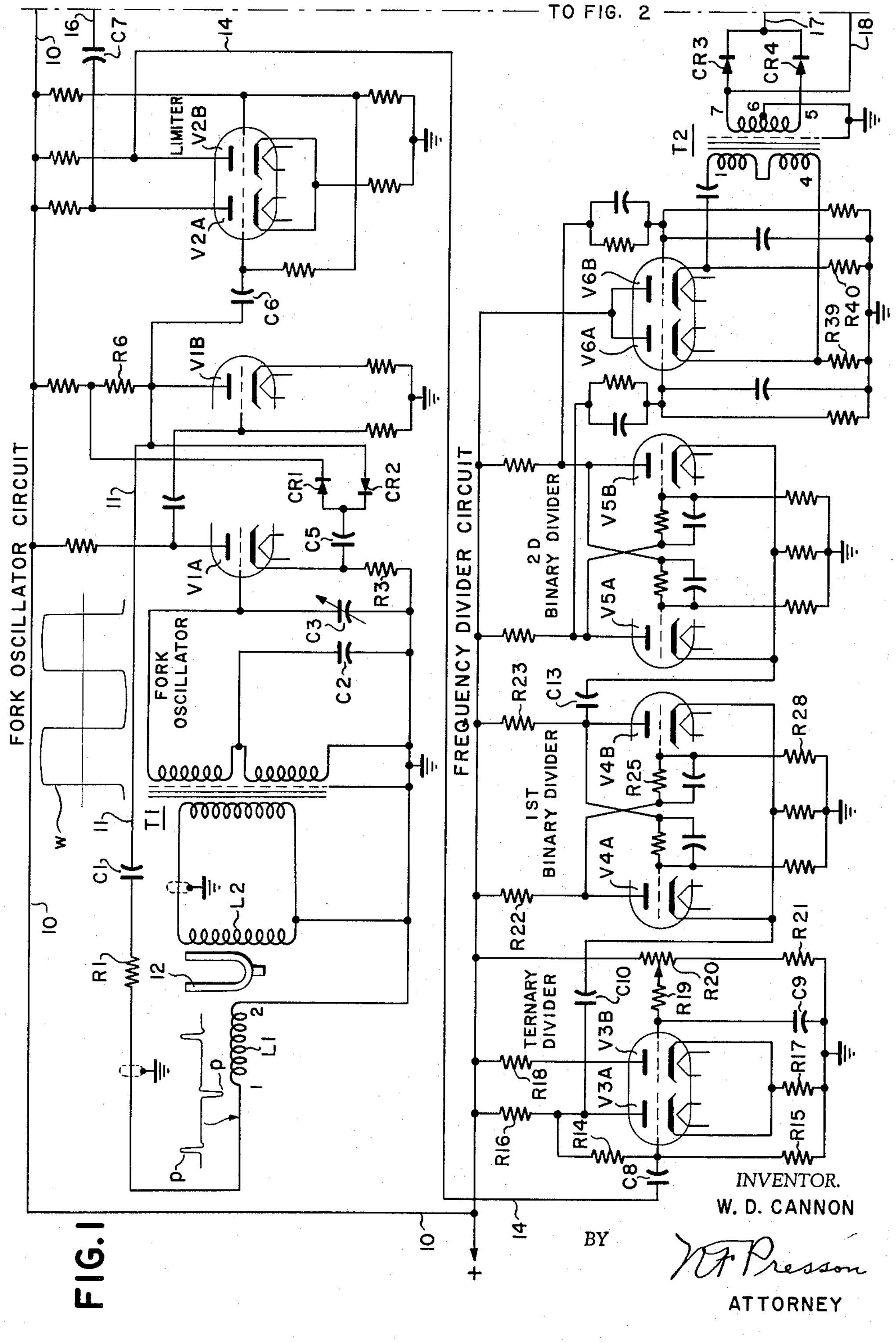

This invention relates generally to a system and apparatus for generating a plurality of alternating currents of different frequencies respectively, each having a high order of amplitude for frequency stability for operating and controlling electrical equipment, and more particularly to a drive pulse generator comprising a novel and improved precision fork oscillating and frequency divider circuit for generating highly accurate basic frequencies from which operating and timing pulses are derived for driving and controlling communication and other circuits and equipment.

In multiplex telegraph systems, facsimile systems, and also in carrier telegraphy it is necessary to use highly accurate sources of driving power for driving, timing and/or controlling electronic devices and apparatus, and vibratile forks with associated oscillator circuits for driving the forks through electromagnetic couplings are commonly employed for this purpose. Such fork driving circuits have, however, been found in many instances to be inaccurate in that the frequency of the alternating current output has varied beyond a permissible range for accurate and efficient operation. One reason for this has been that induced currents within the fork and fork circuit resulting from the effects of the magnetic field set up by alternating current in the drive coil of the fork have been found to produce electromagnetic forces which load the fork and change its amplitude and frequency of vibration. Also, such forks have frequently been subject to the effects of stray magnetic fields set up by the associated oscillator circuits and which have altered the amplitude and frequency of the fork. Such variations in amplitude and frequency are amplified in the associated amplifier and are fed back to the fork in such manner that the variations are built up and result in extreme variations of the frequency of the output current.

In accordance with the instant invention the oscillator circuit for driving a fork through electromagnetic couplings energizes the driving coil of the fork by means of sharp driving pulses instead of alternating current, each of which driving pulses continues only for a very small portion of the time occupied by each excursion of the fork, whereby the fork is isolated from driving forces during the greater portion of each of its excursions. A frequency divider circuit responsive to the output of the fork circuit embodies a frequency selector circuit, and the oscillator, divider and selector circuits together insure that each of the desired output frequencies which is obtainable is characterized by a greater degree of amplitude and frequency stability than heretofore.

An object of the invention is to provide a drive pulse generator for producing different predetermined output frequencies each readily selectable and each having high amplitude and frequency stability.

Another object of the invention is to provide a drive pulse generator including a precision fork circuit in which the disadvantages of prior electromagnetically driven forks are obviated.

A further object is the provision of a fork circuit in which an electromagnetically driven fork continues to vibrate virtually free of energy absorption in its driving coil and which is substantially free of coupling between the fork input and output circuits during the greater portion of each excursion of the fork.

Figure 2:
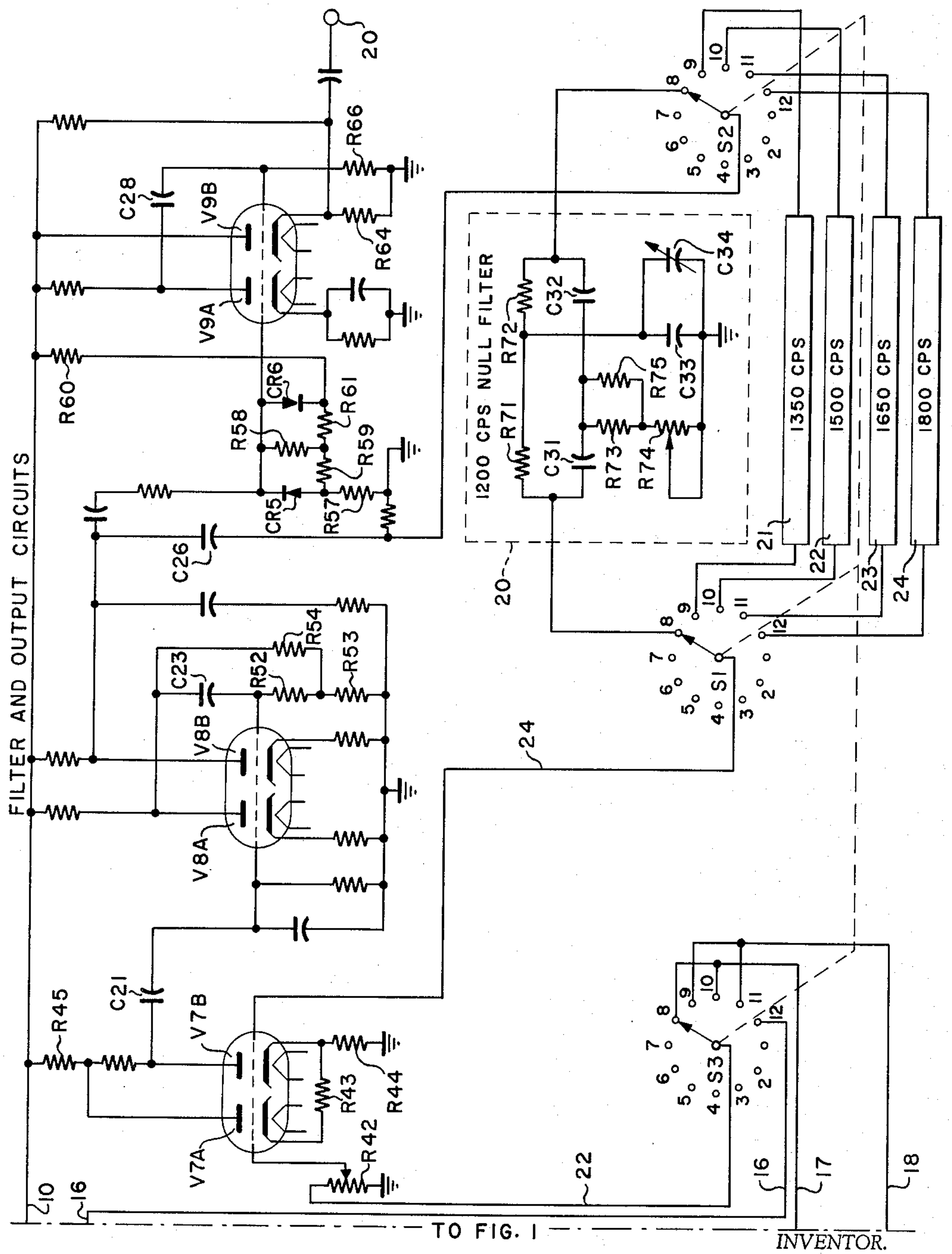

Other objects and advantages will appear from the following detailed description of a preferred form of the invention, taken in connection with the accompanying drawings in which:

FIG. 1 is a circuit diagram showing the fork oscillating and frequency divider circuits; and FIG. 2 shows the filter and individual frequency selector output circuits employed.

*General description*

The system shown in the drawings is a drive pulse generator which provides the basic frequencies from which timing pulses are derived to operate the electronic equipment at a given installation. The generator driving power varies with the number of different frequencies required and, in the illustrative embodiment shown, will vary with the number of channels in use, or available for use, in a multiplex telegraph system adapted either for land line or submarine cable communication circuits. In the instant case the drive pulse generator is adapted to provide a basic frequency of 1800 c.p.s. for 12-channel operation; 1650 c.p.s. for 11-channel operation, and 1500 c.p.s., 1350 c.p.s., or 1200 c.p.s. for 10, 9, or 8-channel operation, respectively. The drive pulse generator includes a fork oscillator circuit and a frequency divider circuit identified by legends in FIG. 1, and frequency selector, filter and output circuits shown in FIG. 2. A basic 1800 c.p.s. is developed in the oscillator circuit by a highly accurate, adjustable fork 12 and its associated fork oscillator, amplifier, and limiter stages. This frequency is applied over a conductor 14 to the frequency divider circuit for subdivision into its subharmonic components, and also over conductor 16 to the frequency selector, filter and output circuits for processing as one of the driving power frequencies.

The frequency divider circuit of FIG. 1 performs one 3-to-1 frequency division in a ternary divider stage comprising tube sections V3A and V3B, and two 2-to-1 frequency divisions V4A, V4B and V5A, V5B, reducing the basic 1800 c.p.s. to 150 c.p.s. The order in which the divider stages are employed obviously may be changed, if desired. The final 150 c.p.s. output is applied through a frequency selector switch section S1, FIG. 2, of a switch comprising sections S1, S2 and S3, to the filter and output circuits either directly or through a rectifier circuit. The 150 c.p.s. A.C. pulses are needed for generating higher odd harmonics in the filter and output circuits, and the rectified 150 c.p.s. pulses for generating even harmonics. The three sections S1, S2 and S3 of the frequency selector switch are ganged, as indicated by broken lines.

When the driving power frequency appropriate for the number of channels in use is selected by the switch S1 to S3, the appropriate basic frequency (as applied from either the oscillator circuit, 1800 c.p.s., or the frequency divider circuit, 150 c.p.s.) is selected and applied to the output and filter circuits at the same time that the appropriate null filter 20 to 24 of FIG. 2 for the selected frequency is switched into the circuit. The selected null filter blocks the desired driving power frequency but permits all other harmonics of the basic frequency to pass through a negative feedback loop to the input of the filter and output circuits. These harmonics are fed back inversely, which tends to hold down their amplification in the amplifier stages. The selected frequency (which is not fed back inversely) is fully amplified. This selected driving power frequency is applied through a cathode follower V7A, FIG. 2, to the output terminal 20 for any desired drive or control purpose, for example, for routing to a phase converter circuit of a receiving or sending multiplex distributor.

*Detailed circuit description*

Referring to the upper portion of FIG. 1, the oscillator circuit comprises the driving fork circuits, the fork oscillator tube section V1A and fork amplifier tube section V1B, and the limiter tube sections V2A and V2B. The source of the basic 1800 c.p.s. is an electronically operated fork 12 which is pre-aged so that its natural frequency and driving force will not change in service. The driving coil L1 sets the fork in motion by energizing one of its tines; the other tine vibrates at 1800 c.p.s. and produces, in the specific embodiment illustrated, a 0.6 v. sine wave in the primary winding of a transformer T1 by way of pickup coil L2. The secondary of the transformer T1 is precisely tuned to the exact 1800 c.p.s. frequency by means of a variable capacitor C3, and the step-up ratio between the primary and the secondary of the transformer raises the voltage of the 1800 c.p.s. to 3.3 v., which is applied to the grid of fork oscillator V1A which, as shown, may comprise one section of a twin triode tube. The value of a capacitor C2 in the secondary circuit of the transformer is selected to yield a frequency of 1800 c.p.s. with the capacitor C3 in mid-scale position. The capacitors are of high Q, i.e., they have very high reactance in proportion to their effective resistance, and hence have practically no dissipation and do not load down the fork or reduce the Q of the fork. The oscillator circuit is made tunable by C3 in order to shift the phase of the sine wave produced in the pickup coil L2 by an amount sufficient to shift the phase of the driving pulses *p* applied to the drive coil L1 to slightly shift, whenever necessary, the natural fork frequency to the desired exact basic frequency of 1800 c.p.s.

The fork oscillator tube section V1A oscillates at the frequency supplied by the tuning fork in its grid circuit and applies its output to the fork amplifier section V1B. A network comprising diodes CR1 and CR2, preferably silicon or germanium diodes, in the cathode circuit of V1A permits V1A to be operated upon the shoulder of its characteristic curve. As the plate of section V1B alternately goes positive and negative in response to the signal input at its grid, the diodes CR2 and CR1, respectively, conduct. The current flow which results always passes through a cathode resistor R3 in a direction which causes the value of the cathode potential to follow the changes in the grid potential. The same grid-to-cathode relationship is therefore retained, irrespective of the signal on the grid; grid limiting is thereby avoided. Under these conditions, plate current remains constant. The square wave form *w* which results is further amplified in fork amplifier tube section V1B. The term "square wave" as employed herein defines a periodic wave which alternately for equal lengths of time assumes one of two fixed values, the time of transition being negligible in comparison.

The value of biasing voltage applied to the diodes CR1 and CR2 is determined by the value of a resistor R6 (which in the embodiment shown is substantially 8K) and is such that no current will flow through the diodes until the voltage swing on the plate of tube section V1B just exceeds the biasing voltage. The value of the biasing voltage on the diodes will therefore depend upon the desired height of the output wave relation to its reference axis. When the wave form is rising and when the potential thereof is less than the biasing potential on the diodes, a steep wave front is obtained. When the potential of the wave front just exceeds the biasing potential, a feedback current will flow through capacitor C5 to the cathode of V1A and reduce the gain of the amplifier.

The alternating output wave *w* from the plate of V1B is substantially a square wave form applied to conductor 11 in the circuit of the driving coil L1. This circuit includes a differentiating device, preferably a capacitor C1, which produces the sharp driving pulses *p* with steep wave fronts at the crossover periods of the output wave *w*, and also a damping impedance, preferably a resistor R1, to shape the pulses and substantially prevent tailing of the pulses. The coil L1 is thus energized by the sharp driving pulses and alternating current is not kept on the coil, and therefore the fork is isolated from driving forces during the greater portion of each of its excursions, and its amplitude and frequency are kept constant and are not detrimentally affected by coupling between its input and output circuits.

The signal from the plate of V1B is also applied through a coupling capacitor C6 to the first section V2A of a limiter which utilizes cathode clipping to produce a square wave output. The grids of both sections V2A and V2B are biased at the same positive potential, and the cathodes, which are coupled, drive one another as the input is applied to the grid of section V2A. As negative signal input causes current flow through V2A to decrease, section V2B conducts more heavily, holding the cathode potential at a constant positive value so that V2A rapidly reaches cutoff. When V2A cuts off, current flows through V2B at a steady rate. When the input on the grid of V2A goes positive, current increases through V2A and consequently decreases through V2B until V2B is cut off. The square wave output produced at the plate of V2B (6 v. peak-to-peak) is transmitted over conductor 14 and is coupled through a differentiating capacitor C8 to the ternary divider V3A, V3B in the frequency divider circuit. The 1.5 v. flat-topped wave form from the plate of V2A is applied through a capacitor C7 and over conductor 16 to the terminal 12 of a bank S3 of the frequency selector switch.

*Frequency divider circuit.*—The frequency divider circuit comprises the ternary divider V3A, V3B, a first binary divider V4A, V4B, a second binary divider V5A, V5B, a cathode follower V6A, V6B, a differentiating output transformer T2, and a rectifier network made up of silicon or germanium diodes CR3 and CR4.

The ternary divider V3A, V3B is a twin triode operated as a non-symmetrical multivibrator. The 1000 c.p.s. output of the limiter circuit is received over conductor 14 and is differentiated by the capacitor C8 and applied to the grid of section V3A. The voltage divider made up of resistors R16, R14 and R15 supplies positive grid bias for V3A so that this stage operates at plate saturation. Positive input pulses, therefore, have no effect on circuit operation. The multivibrator is synchronized to negative input pulses. Section V3B operates at approximately the frequency established by a resistance R19 and a capacitor C9 which, together with a variable resistor R20 and a resistor R21, determine the grid bias for the second section V3B. When the tube operates, the first section V3A conducts more current through its cathode resistor R17 because of its smaller plate resistance. This places the common cathode at a more positive potential than exists when V3B conducts. So long as the cathode is more positive than the grid of V3B, this section of the tube is cut off. Capacitor C9 discharges slowly through resistances R19, R20 and R21, holding the grid of V3B negative so long as V3A conducts. Under this condition there is no plate current flowing through V3B so that the bias on the grid of V3A is sufficiently positive to keep the tube operating at saturation.

When the charge on timing capacitor C9 (and consequently the bias on the grid of V3B) reaches a point where the grid permits plate current to flow in V3B, the potential at the plate of V3B and therefore at the grid of V3A is reduced. The value of resistance R18 is high compared with that of resistance R16, which is the plate resistor for V3A, and R17, the cathode resistor. Current flow through R18 produces a very large reduction in the voltage at the grid of V3A, sufficient to cause the section to cut off. As V3A cuts off, its plate voltage rises and produces a positive output pulse, supplied through capacitor C10 to the first binary divider.

The multivibrator action of the ternary divider is synchronized with the negative input pulses. Negative input pulses cause V3A to cut off. During this period, the output pulse is supplied to the first binary divider. The charging time of C9 determines the interval until V3A conducts again and, consequently, the readiness of the circuit to respond to another pulse. When V3A turns on, C9 begins to discharge slowly, holding V3B off, and, therefore, V3A on for the duration of the next two negative input pulses. Since the ternary divider circuit responds to every third negative input pulse, the 1800 c.p.s. input is divided by three, and the positive output pulses applied to the first binary divider circuit are at a frequency of 600 c.p.s.

*First binary divider.*—The first binary divider V4A and V4B is a twin-triode connected as a bistable flip-flop multivibrator. This is a modified Eccles-Jordan circuit with the output from the plate of V4A applied to the grid of V4B, and the output of the plate of V4B applied to the grid of V4A. The positive input pulse from the ternary divider is applied to both cathodes simultaneously, increasing the potential difference between the cathode and both grids. The positive pulse has no effect on the section which is not conducting, but it decreases current flow through the section which is conducting. If V4B is cut off and V4A is conducting when the positive pulse arrives on the cathode, the resulting drop in plate current for V4A causes a more positive voltage to be applied to the grid of V4B through the voltage divider comprising resistors R22, R25 and R28. With the passage of the input pulse, the cathode returns to normal bias, but the grid of V4B remains more positive than the cathode, and this stage conducts. Plate current through resistor R23 reduces the voltage available for the grid of V4A, and V4A can not conduct. Section V4B continues to conduct until the next positive input pulse raises the common cathode potential, decreasing the current flow through V4B and resistor R23, thereby causing V4A to conduct. Each stage of the first binary divider is triggered by every other input pulse and operates at a frequency of 300 c.p.s. The output from the first binary divider is taken from the plate of V4B and fed to the second binary divider through a coupling capacitor C13.

*Second binary divider.*—The second binary divider V5A, V5B is a twin-triode multivibrator flip-flop exactly the same as the first binary divider. The 300 c.p.s. positive input from V4B of the first binary divider is applied to the common cathode of V5A and V5B, causing flip-flop action to take place. The operating stage cuts off, and the stage which had previously been cut off turns on. Each stage is alternately triggered by the 300 c.p.s. input frequency and operates at a frequency of 150 c.p.s., 180 degrees out of phase with the other. The output from the plate of V5A is fed to the grid of the first section V6A of a cathode follower, and the output of the plate of V5B is fed to the grid of the second section V6B of the cathode follower.

Since of the two outputs of the multivibrator V5A and V5B are 180 degrees out of phase with each other, whenever a positive portion of the square wave is applied to the grid of V6A, a negative portion is applied to the grid of V6B. With its grid more positive, more current flows through V6A and cathode resistor R39 so that the cathode of V6A becomes more positive. At the same time, the negative pulse on the grid of V6B causes the flow of current through V6B and cathode resistor R40 to decrease, and the cathode of V6B becomes more negative. The positive potential from the cathode of V6A connects to terminal 4 of the primary winding of a transformer T2 at the same time that the less positive potential from the cathode of V6B is applied to terminal 1. Current then flows in the primary winding of T2 from terminal 4 to terminal 1. When the flip-flop action causes the multivibrator to switch its conducting conditions, and the output conditions of each multivibrator stage (and consequently the input conditions of each cathode follower stage) are reversed, current flows in the transformer T2 primary from terminal 1 to terminal 4.

The primary of T2 is broadly tuned to the center of the band (between 1200 and 1800 c.p.s. in the present instance) and yields a pulse rich in odd harmonics at the desired frequencies. When rectified, this pulse is rich in even harmonics in the same frequency band. The 150 c.p.s. pulse train required for producing odd harmonics in the filter and output circuits is applied from terminal 7 and terminal 6 (which is the grounded center tap) of the T2 secondary to the frequency selector switch section S3 at terminals 9 and 11. The A.C. output across terminals 5 and 7 of the secondary winding is rectified through silicon or germanium diodes CR3 and CR4. Positive alternations are rectified by diode CR4, and negative alternations are rectified by diode CR3, resulting in a 150 p.p.s. (pulses per second) output which is applied over conductor 17 to terminals 8 and 10 of section S3 of the frequency selector switch, FIG. 2. Section S3 accepts at its terminal 12 the 1800 c.p.s. from the plate of the fork oscillator, the unrectified 150 p.p.s. pulse train and its multiples at terminals 9 and 11, and the rectified 150 p.p.s. pulse train and its multiples at terminals 8 and 10. The output from switch section S3 is taken from its switch arm, over conductor 17, and across a variable resistor R42, FIG. 2, to ground.

*Filter and output circuits.*—The filter and output circuits, FIG. 2, comprise a cathode follower V7A (which acts as a buffer for the rectified circuits, the frequency divider circuit, and limiter V2A, V2B of the oscillator circuit), a cathode-driven amplifier V7B, a twin-stage feedback amplifier V8A, V8B, and twin cathode follower V9A, V9B. Five filters 20 to 24, preferably null filters, are connected between the output of feedback amplifier V8A, V8B and the grid of the cathode driven amplifier V7B. The input frequency selected by section 3 of the frequency selector switch is applied over conductor 22 through the variable resistor R42 to the grid of cathode follower V7A. As the positive voltage on the grid of V7A causes an increase in plate current, the cathode in each stage of V7A, V7B becomes more positive because of the larger voltage drops across resistors R44 and R43. Current flow through V7B decreases. The output from the appropriate null filter is applied through selector switch section S1 to the grid of V7B. The undesired harmonics of the selected frequency appear at this grid out of phase with the input frequency, while the desired harmonic, unhampered by feedback voltage, receives full amplification through the cathode driven amplifier (and two subsequent amplifier stages). As the current flow through V7B decreases, the plate voltage becomes positive. When the input signal on the grid of V7A swings negative, the cathode voltage is dropped so that current flow through V7B increases, and the output from the plate of V7B becomes negative.

Tube sections V8A and V8B comprise a twin-triode amplifier. Output from the plate of V7B is applied through coupling capacitor C21 to the grid of V8A. The amplified signal from V8A is fed through capacitor C23 to the grid of V8B where it is further amplified. Capacitor C23 and resistors R52, R53 and R54 make up the low frequency cut-off network of the amplifier. From the plate of V8B, the output is applied through coupling capacitor C26, switch section S2, through the appropriate null filter 20 to 24 (as selected by the frequency selector switch), and switch section S1 to the grid of the cathode driven amplifier V7B. This feedback is in phase with the input from V7A and limits the potential between the cathode and the grid of V7B. This decreases the flow of plate current in V7B and, consequently, eliminates the gain of the stage for the feedback frequencies.

There are five null filter circuits shown, one each for 1800 c.p.s., 1650 c.p.s., 1500 c.p.s., 1350 c.p.s., and 1200 c.p.s. These filters are selected by the frequency selector switch to correspond to 12, 11, 10, 9, and 8 channel multiplex operation, respectively. As above stated, the input to each filter is applied from the plate of V8B through section S2 of the selector switch, and the output is fed from section S1 of the selector switch over conductor 24 to the grid of V7B. The switch positions have numbers which respectively correspond to the number of multiplex channels in use, and the filter which corresponds to the selected frequency for operation with that particular number of channels blocks the frequency for which the switch has been set.

Each individual filter, as seen from the circuit of filter 20, is a single-frequency null network consisting of a twin T circuit. The first T network contains resistors R71 and R72 in the series arm, and a capacitor C33 in parallel with variable capacitor C34 in the shunt arm. The second T network contains capacitors C31 and C32 in the series arm, with resistor R73 in series with potentiometer R74 in the shunt arm. The values of the fixed components in all five filter circuits preferably are identical; each filter network is tuned to react to its assigned frequency by the adjustment of C34 and R74. In the first T of each null filter, the current of the assigned frequency lags the voltage by 90 degrees, while in the second T the current leads the voltage by 90 degrees. The output waveforms of each T are equal in amplitude, but are 180 degrees out of phase. When these waveforms are added, they cancel each other. Consequently, the selected driving power frequency is nullified in the filter while all other frequencies are permitted to pass. The value of components in the null filters determined by formulas are:

C31. $$C=\frac{1}{2\pi f R_{71}}\pm\tfrac{1}{2}\%$$

C32. $$C=\frac{1}{2\pi f R_{72}}\pm\tfrac{1}{2}\%$$

C33. $$(C31+C32-25\mu\mu f.)\pm\tfrac{1}{2}\%$$

R75. $$\frac{1}{R_{73}}+\frac{1}{R_{75}}=\frac{1}{49K}$$

Unless otherwise indicated above, resistors are in ohms, and capacitors are in $\mu$f. The value of C32 is selected to yield a frequency of 1800~ with C33 in mid scale.

*Grid limiter network.*—The grid limiter network, seen in the upper right hand portion of FIG. 2, comprises directing diodes CR5 and CR6 and resistors R57 through R59. The limiting network clips the peaks of the input to the grid of tube section V9A to form a square wave input. Resistor R58 is the grid resistor for V9A and receives its grid bias potential from the voltage divider formed by R57, R59, R61 and R60. Directing diodes CR5 and CR6 are connected in parallel with grid resistor R58; CR6 (poled in the forward direction) is connected between the input of the stage and a point of higher potential on the voltage divider, and diode CR5 is connected between the input and a point of lower potential. When the positive portion of the input signal is applied to the grid of V9A across R58, and the A.C. wave exceeds the threshold potential for CR6 (+4 volts), CR6 conducts and clamps the grid at +4 volts for the duration of the wave. When the input signal reverses polarity and drops below +2 volts, diode CR5 conducts and clamps the grid of V9A at +2 volts for the duration of the negative current portion of the input wave. With the grid voltage limited in this fashion, the input signals to the grid of V9A can not exceed two volts peak-to-peak.

Tube sections V9A, V9B comprise a twin-triode consisting of one stage of amplification V9A which is followed by a cathode follower stage V9B. The 2 volt peak-to-peak input wave is applied to the grid of V9A, amplified, and fed to the grid of V9B. The output of V9A is a 38 volt square wave, the square shape being formed by the limiting of the input signal by the limiting network in the grid circuit. The tube section V9A, an amplifier with a gain of approximately 20, is followed by the cathode follower V9B. The differentiating network composed of capacitor C28 and resistance R66 converts the square wave at the plate of V9A to a series of positive and negative pulses. V9B is biased beyond cut-off so that the negative pulses have no effect on the operation of the stage. The positive pulses at the grid of V9B increase the current flow through cathode resistor R64 and make the cathode voltage more positive. This voltage is taken off the cathode and applied to the output terminal 20 as a series of positive (12 volt peak-to-peak) pulses which thus comprise the output of the drive pulse generator, the frequency of the output pulses being determined by the instant setting of the frequency selector switch which in the instant case is 1800, 1650, 1500, 1350 or 1200 p.p.s. From here they are applied to the equipment which they are to drive or control. For example, in a telegraph multiplex communication system the output pulses may be applied to a phase converter in either the sending or receiving distributor for the first stage of processing which converts this basic driving power frequency to timing pulses that synchronize the operation of all electronic circuits in the multiplex equipments. Only five output frequencies are utilized in the illustrative embodiment shown, but as indicated by the unused switch bank contacts of S1—S3, many more different frequencies may be obtained whenever required, by the use of additional divider and filter circuits. Also, the range of frequencies will depend upon the nature and purpose of the communication or other circuits and equipment driven and/or controlled by the output pulses.

While the invention has been described with respect to a particular embodiment thereof and in particular uses, it is to be understood that it is not limited thereto since various modifications and uses thereof will occur to those versed in the art without departing from the spirit and scope of the invention as set forth in the appended claims.

What is claimed is:

1. A drive pulse generator having an output circuit for providing different selectable predetermined current pulse frequencies each having high amplitude and frequency stability, comprising a precision fork circuit for generating a basic alternating current frequency, means including a frequency divider circuit driven by said basic fork frequency for producing a frequency comprising a subharmonic of said basic frequency, means including a differentiating device responsive to the output of said divider circuit for producing a plurality of different frequencies comprising odd harmonics of said subharmonic frequency, means including a rectifier network responsive to the output of said differentiating device for producing a plurality of different frequencies comprising even harmonics of said subharmonic frequency, frequency selector switch means settable to different positions for selecting either said basic frequency or a desired one of said even or odd harmonic frequencies, filter and feedback amplifier circuits controlled by said selector switch for suppressing all of said frequencies except the one represented by the instant setting of the switch, and means including said feedback amplifier circuit for applying the selected frequency to said output circuit of the pulse generator.

2. A drive pulse generator having an output circuit for providing different selectable predetermined current pulse frequencies each having high amplitude and frequency stability, comprising a precision fork circuit for generating a basic alternating current frequency, means including a frequency divider circuit driven by said basic fork frequency for producing a frequency comprising a subharmonic of said basic frequency, means responsive to the output of said divider circuit for producing a plurality of different frequencies comprising even and odd harmonics of said subharmonic frequency, frequency selector switch means having a plurality of ganged switch banks settable to different positions for selecting either said basic frequency or a desired one of said even or odd harmonic frequencies, a filter and output circuit comprising a cathode follower having two input circuits and an output circuit followed by a feedback amplifier and a plurality of null filters respectively for said selectable frequencies for suppressing the frequency represented by the instant setting of the switch, said selector switch having a first switch bank for applying the selected one of said frequencies to one of the input circuits of said cathode follower, a second switch bank for applying the output of said feedback amplifier to the input of the selected null filter, and a third switch bank for applying the output of the selected null filter to the second of said input circuits of the cathode follower, and means for applying the selected frequency to said output circuit of the pulse generator.

3. A drive pulse generator comprising a vibratile fork having a predetermined natural frequency and associated electromagnetic drive and pickup coils, a tunable oscillator circuit coupled to the pickup coil, an amplifier for amplifying the output of said oscillator circuit, a network comprising rectifiers connected to provide a negative feedback circuit between the amplifier and the oscillator circuit, means for applying a biasing voltage on the rectifiers having a value such that the amplifier output current will not flow through the negative feedback circuit until the voltage swing in the output of the amplifier just exceeds said biasing voltage to thereby cause the output of the amplifier to comprise an alternating current which has a substantially square wave form, and means for isolating the fork from driving forces during the greater portion of each of its excursions comprising means for producing from said wave form sharp driving pulses occurring only at the crossover periods of the wave form and applying only said sharp driving pulses to said drive coil of the fork.

4. A drive pulse generator comprising a vibratile fork having a predetermined natural frequency and associated electromagnetic drive and pickup coils, a tunable circuit coupled to the pickup coil, said oscillator circuit including an oscillator tube having control grid, plate and cathode elements, an amplifier tube having control grid, plate and cathode elements for amplifying the output of said oscillator, a network comprising rectifiers connected to provide a negative feedback circuit between the plate of the amplifier tube and the cathode of the oscillator tube, a source of biasing potential and a biasing resistor connected across said network to cause the biasing voltage on the rectifiers to have a value such that the amplifier plate current will not flow through the rectifiers until the voltage swing on the plate of the amplifier tube just exceeds said biasing voltage to thereby cause the output of the amplifier tube to comprise an alternating current which has a substantially square wave form, and means for isolating the fork from driving forces during the greater portion of each of its excursions comprising means for producing from said wave form sharp driving pulses occurring only at the crossover periods of the wave form and applying only said sharp driving pulses to said drive coil of the fork.

5. A drive pulse generator having an output circuit for providing different selectable predetermined current pulse frequencies each having high amplitude and frequency stability, comprising a precision fork circuit for generating a basic alternating current frequency, said fork circuit comprising an isochronous vibrating fork member, pickup coil means located adjacent thereto and energized thereby with an alternating timing voltage, limiting amplifier means operative upon said voltage to produce a rectangular timing wave, transformer means comprising at least a secondary winding intercoupling said pickup coil means and said limiting amplifier means, and phase shifter means comprising only reactive circuit elements consisting of condenser means at least a portion of which is variable shunting at least a portion of said secondary winding and coil means comprising said secondary winding, whereby the inherent and reflected inductance in said coil means is tuned by said condenser means, a fork driving coil, and bilaterally conductive differentiating means including damping means comprising a condenser and a resistor for connecting between said limiting amplifier means and said fork driving coil for applying phase adjustable differentiated rectangular waves in the form of sharp driving pulses of alternating polarity having adjustable time phase with respect to said fork member, to said fork driving coil for driving said fork member, said fork driving coil being located adjacent to said fork member in fork driving relationship thereto, means including a frequency divider circuit driven by said basic fork frequency for producing a frequency comprising a subharmonic of said basic frequency, means responsive to the output of said divider circuit for producing a plurality of different frequencies comprising even and odd harmonics of said subharmonic frequency, frequency selector switch means settable to different positions for selecting either said basic frequency or a desired one of said even or odd harmonic frequencies, and filter and feedback amplifier circuits controlled by said selector switch for suppressing all of said frequencies except the one represented by the instant setting of the switch, and means including said feedback amplifier circuit for applying the selected frequency to said output circuit of the pulse generator.

6. A drive pulse generator comprising a vibratile fork having a predetermined natural frequency, electromagnetic drive and pickup coils associated therewith, an oscillator circuit, transformer means comprising at least a secondary winding intercoupling said pickup coil means and said limiting amplifier means, and phase shifter means comprising only reactive circuit elements consisting of condenser means at least a portion of which is variable shunting at least a portion of said secondary winding and coil means comprising said secondary winding, whereby the inherent and reflected inductance in said coil means is tuned by said condenser means, an amplifier for amplifying the output of said oscillator, means for causing the output of the amplifier to comprise an alternating current which has a substantially square wave form, and means for isolating the fork from driving forces during the greater portion of each of its excursions comprising means for producing from said wave form sharp driving pulses of alternating direction occurring only at each crossover period of the wave form and applying only said sharp driving pulses to said drive coil of the fork.

7. A drive pulse generator comprising a vibratile fork having a predetermined natural frequency, electromagnetic drive and pickup coils associated therewith, an oscillator circuit, transformer means comprising at least a secondary winding intercoupling said pickup coil means and said limiting amplifier means, and phase shifter means comprising only reactive circuit elements consisting of condenser means at least a portion of which is variable shunting at least a portion of said secondary winding and coil means comprising said secondary winding, whereby the inherent and reflected inductance in said coil means is tuned by said condenser means, an amplifier for amplifying the output of said oscillator, means for causing the output of the amplifier to comprise an alternating current which has a substantially square wave form, and means for isolating the fork from driving forces during the greater portion of each of its excursions, comprising a differentiating device in the drive circuit of the fork which includes an impedance device for removal of pulse trailing edge irregularities for producing from said wave form sharp driving pulses of alternating direction occurring only at each crossover period of the wave form and applying only said sharp driving pulses to said drive coil of the fork.

8. A drive pulse generator comprising a vibratile fork having a predetermined natural frequency, electromagnetic drive and pickup coils associated therewith, an oscillator circuit, transformer means comprising at least a secondary winding intercoupling said pickup coil means and said limiting amplifier means, and phase shifter means comprising only reactive circuit elements consisting of condenser means at least a portion of which is variable shunting at least a portion of said secondary winding and coil means comprising said secondary winding, whereby the inherent and reflected inductance in said coil means is tuned by said condenser means, an amplifier for amplifying the output of said oscillator, means for causing the output of the amplifier to comprise an alternating current which has a substantially square wave form, and means for isolating the fork from driving forces during the greater portion of each of its excursions comprising a differentiating device in the drive circuit of the fork which includes a resistor for removal of pulse trailing edge irregularities for producing from said wave form sharp driving pulses of alternating direction occurring only at each crossover period of the wave form and applying only said sharp driving pulses to said drive coil of the fork.

9. A drive pulse generator comprising a vibratile fork having a predetermined natural frequency, electromagnetic drive and pickup coils associated therewith, an oscillator circuit, transformer means comprising at least a secondary winding intercoupling said pickup coil means and said limiting amplifier means, and phase shifter means comprising only reactive circuit elements consisting of condenser means at least a portion of which is variable shunting at least a portion of said secondary winding and coil means comprising said secondary winding, whereby the inherent and reflected inductance in said coil means is tuned by said condenser means, an amplifier for amplifying the output of said oscillator, means for causing the output of the amplifier to comprise an alternating current which has a substantially square wave form, and means for isolating the fork from driving forces during the greater portion of each of its excursions comprising means for producing from said wave form sharp driving pulses of alternating direction occurring only at each crossover period of the wave form and applying only said sharp driving pulses to said drive coil of the fork, said variable condenser being tunable to shift the phase of the sine wave produced in said pickup coil by an amount sufficient to shift the phase of the driving pulses applied to the drive coil of the fork to slightly shift the natural frequency of the fork to a desired basic frequency.

10. A drive pulse generator comprising a vibratile fork having a predetermined natural frequency, electromagnetic drive and pickup coils associated therewith, an oscillator circuit, transformer means comprising at least a secondary winding intercoupling said pickup coil means and said limiting amplifier means, and phase shifter means comprising only reactive circuit elements consisting of condenser means at least a portion of which is variable shunting at least a portion of said secondary winding and coil means comprising said secondary winding, whereby the inherent and reflected inductance in said coil means is tuned by said condenser means, an amplifier for amplifying the output of said oscillator, means for causing the output of the amplifier to comprise an alternating current which has a substantially square wave form, and means for isolating the fork from driving forces during the greater portion of each of its excursions comprising means for producing from said wave form sharp driving pulses of alternating direction occurring only at each crossover period of the wave form and applying only said sharp driving pulses to said drive coil of the fork, the circuit of said drive coil including an impedance device for removal of pulse trailing edge irregularities, said variable condenser being tunable to shift the phase of the sine wave produced in said pickup coil by an amount sufficient to shift the phase of the driving pulses applied to the drive coil of the fork to slightly shift the natural frequency of the fork to a desired basic frequency.

References Cited in the file of this patent

UNITED STATES PATENTS 2,346,984 Mead ---------------- Apr. 18, 1944
2,541,320 Bachelet -------------- Feb. 13, 1951
2,648,006 Mabry ---------------- Aug. 4, 1953
2,679,006 Doelz ----------------- May 18, 1954
2,706,785 Volz ----------------- Apr. 19, 1955